2,920,054
Patented Jan. 5, 1960

2,920,054
COATING COMPOSITION COMPRISING NITROCELLULOSE AND ALKYD RESIN AND ARTICLE COATED THEREWITH

Aloysius Norbert Walus, Flint, Mich., assignor to E. I. du Pont de Nemours and Company, Wilmington, Del., a corporation of Delaware No Drawing. Application June 14, 1956
Serial No. 591,265

8 Claims. (Cl. 260—16)

This invention relates to nitrocellulose lacquers, particularly to light-colored lacquers which have improved resistance to discoloration from contact with mineral oils, greases, road tar, rubbery adhesives and the like.

Lacquers comprising nitrocellulose, oil-modified alkyd resin and plasticizer are used extensively as the topcoat lacquer on automobile bodies. During the assembly of automobiles, these coatings come in contact with rubbery adhesives, greases and oils, particularly the oils used in rubbing compounds. In service, they come in contact with lubricating oils, greases and road tar. Prolonged contact with any of these materials frequently produces a discolored spot in the coating. The discoloration is apparent when the offending substance is wiped off, it is usually yellow, and it is particularly objectionable when the original color of the coating is light, e.g. white or a light-colored tint.

The principal object of this invention is to improve the resistance of nitrocellulose lacquers to this kind of discoloration.

Another object is to do so without interfering with the other important requirements of lacquers of this type, such as outdoor durability, resistance to blistering, resistance to cracking in cold weather, and resistance to lifting.

These objects are accomplished by providing a light-colored liquid coating composition comprising pigment, volatile organic solvent and organic film-forming material consisting of (a) lacquer grade nitrocellulose, and for each part by weight of nitrocellulose, (b) 0.5–1.5 parts by weight of alkyd resin containing unesterified hydroxyl groups equivalent to 1.5%–7% by weight of glycerine, having an acid number less than 15, and being modified with 40%–50% by weight of hydrogenated castor oil, said oil having an iodine number less than 8, and (c) 0.0–0.6 part by weight of plasticizer; the total weight of (b) plus (c) being 1.0–1.5 times the weight of (a).

It is to be understood that, although some improvement over prior art compositions in resistance to discoloration can be obtained with ingredients and proportions slightly outside the limits specified above, it is necessary to observe these limits in order to obtain the optimum improvement in resistance to discoloration without an objectionable sacrifice in application properties, durability, hardness, flexibility and other important requirements. To this extent, the limits defined above are critical.

The amount of hydrogenated castor oil chemically combined in the alkyd resin must be between 40% and 50% by weight of said resin. Alkyd resins containing less than about 40% of this modifier impart sufficiently more hardness and thermoplasticity to the lacquer coatings to make them undesirable for commercial use, such as on automobile bodies. Alkyd resins containing more than about 50% of this modifier adversely affect the oil stain resistance and other essential properties of the lacquer coatings so that the desired results of this invention are not obtained. Also, relatively expensive solvents are required in manufacturing homogeneous alkyd resin solutions as the hydrogenated castor oil content is increased much above 50%. A preferred amount of oil is 45%–48% by weight of the modified resin.

The hydrogenated castor oil must have an iodine number less than 8 in order to yield the optimum improvement in the balance of properties of the new lacquers, particularly the improved stain resistance combined with freedom from lifting. For maximum improvement, the iodine number should be 5 or less. Castor oil has an iodine number of the order of 82–90. As hydrogenation proceeds, the iodine number of the hydrogenated product becomes progressively less. Products having an iodine number less than 8 are substantially completely hydrogenated. They are commercially available. Hydrogenated castor oil fatty acids corresponding to the above defined hydrogenated castor oil can be used in accordance with techniques known to persons skilled in the alkyd resin art. Hydrogenation processes are well known whereby carbon-to-carbon double bonds are saturated, such as by reaction with hydrogen at an elevated temperature, e.g. 100°–200° C., in the presence of a catalylst, e.g. nickel.

An additional requirement of the alkyd resins used in this invention is that they contain a specific amount of unreacted hydroxyl, i.e. —OH groups, derived from the glycerine component of the oil and/or the polyhydric alcohol used. For convenience of expression, the unreacted hydroxyl content is calculated as glycerine, although it is generally accepted that the unreacted hydroxyl in an alkyd resin exists as partially esterified polyhydric alcohol. In other words, three unreacted hydroxyl groups are equivalent to one mol of free glycerine. If, when calculated on this basis, the amount of unreacted hydroxyl in the alkyd resin is maintained between 1.5% and 7% by weight of glycerine based on the modified resin, the other desirable properties of the alkyd resin are obtained such as solubility, compatibility with nitrocellulose, acid number and viscosity. These are all necessary to provide commercially acceptable lacquers which are easily sprayed and which yield smooth, glossy and durable coatings. A preferred range of unreacted hydroxyl content is that equivalent to 4.5%–6% by weight of glycerine based on the modified resin.

A final requirement of the alkyd resins used in this invention is that the acid number must be less than 15 in order to avoid blistering of the coatings in service and/or reactivity (yielding discoloration or viscosity increase) with certain acid-sensitive pigments commonly used in liquid coating compositions. For maximum effectiveness in avoiding these deficiencies, an acid number of not more than 5 is preferred.

A further requirement of the lacquers of this invention is that the components of the organic film-forming material used therein must remain within certain weight proportions to each other. These proportions of nitrocellulose:alkyd resin:plasticier must be between 1:0.5:0.6 respectively and 1:1.5:0 respectively. In other words, based on the nitrocellulose content, when the alkyd resin is reduced, it must be compensated for by an increase in plasticizer. Otherwise the dry coating is too hard and lacks the flexibility necessary for an automobile lacquer. Conversely, as the alkyd resin content is increased, less plasticizer is needed until at a nitrocellulose:alkyd resin ratio of 1:1.5 no plasticizer is needed. As the alkyd resin is increased above this point, or if a substantial amount of plasticizer is used at this point, the dry coating is too thermoplastic for use on automobiles. Also, the advantages of the nitrocellulose are obscured, and the liquid coating takes too long to dry. The proper balance of desirable characteristics in the products of this invention is obtained by using, for each part by weight of nitrocellulose, 0.5–1.5 parts by weight of an alkyd resin as defined above and 0.0–0.6 part by weight of plasticizer, and further by maintaining the total weight of alkyd resin plus plasticizer between 1.0 and 1.5 times the weight of nitrocellulose.

The following examples are provided to illustrate this invention, but it is not limited thereby. Unless otherwise indicated, the parts and percentages are by weight.

EXAMPLE 1

Preparation of 48% hydrogenated castor oil modified alkyd resin

A 48% hydrogenated castor oil modified alkyd resin of this invention was prepared by placing 2391 parts by weight of hydrogenated castor oil (having an iodine number specification of 5 maximum) and 478 parts of glycerine in a closed resin kettle equipped with a thermometer, agitator and reflux condenser with water trap. The charge was heated to 400° F. under a carbon dioxide blanket which was maintained during the balance of the process. Then 2 parts of litharge were added, and the charge was heated to 450° F. and held at this temperature for 45 minutes (a sample of the charge formed a clear 30% solution in 23 A. denatured alcohol). Then 1805 parts of phthalic anhydride were added. When this had melted, 210 parts of xylene and 538 parts of glycerine were added to the charge, and the water trap in the condenser was filled with xylene. The charge was refluxed at 410°–420° F. until the solids had an acid number of 3, whereupon heating was discontinued and 2283 parts of toluene were added. When the charge had cooled to below 250° F., 830 parts of butyl alcohol were added.

The resulting alkyd resin solution contained about 60% solids and had a Gardner-Holdt viscosity of about V at room temperature. The resin solids contained 48% of chemically combined hydrogenated castor oil and unesterified hydroxyl groups equivalent to 5.1% of glycerine, the remaining 46.9% being considered as completely esterified glycerine and phthalic anhydride.

Preparation of lacquer

A stain resistant lacquer of this invention having the following formula was prepared by grinding the pigment with a portion of the alkyd resin solution to produce a smooth dispersion and mixing the resulting dispersion with a solution of the remaining ingredients:

| | Parts by weight |
|---|---|
| Lacquer grade nitrocellulose (half-second viscosity) | 12.8 |
| 48% hydrogenated castor oil modified alkyd resin prepared above (solids) | 13.5 |
| Dibutyl phthalate plasticizer | 1.3 |
| Titanium dioxide pigment | 11.4 |
| Solvents and diluents | 61.0 |
| | 100.0 |

This lacquer was retained for subsequent testing. It contained 1.05 parts by weight of alkyd resin and 0.1 of plasticizer for each part by weight of nitrocellulose.

EXAMPLE 2

Preparation of 42% hydrogenated castor oil modified alkyd resin

A 42% hydrogenated castor oil modified alkyd resin of this invention was prepared by placing 1050 parts by weight of hydrogenated castor oil (having an iodine number specification of 5 maximum) and 208 parts of glycerine in a closed resin kettle equipped with a thermometer, agitator and reflux condenser with water trap. The charge was heated to 300° F. when 1 part of litharge was added. Then the charge was heated to 450° F. and held at this temperature for 35 minutes (a sample of the charge formed a clear 30% solution in 23 A. denatured alcohol). Then 994 parts of phthalic anhydride were added. When this had melted, 105 parts of xylene and 375 parts of glycerine were added to the charge, and the water trap in the condenser was filled with xylene. The charge was refluxed at 360°–410° F. until the solids had an acid number of 4.8, whereupon heating was discontinued and 1510 parts of xylene were added. The charge was then cooled to room temperature.

The resulting alkyd resin solution contained about 60% solids and had a Gardner-Holdt viscosity of about Z2 at room temperature. The resin solids contained 42% of chemically combined hydrogenated castor oil and unesterified hydroxyl groups equivalent to 6.6% of glycerine, the remaining 51.4% being considered as completely esterified glycerine and phthalic anhydride.

Preparation of lacquer

A stain resistant lacquer of this invention having the following formula was prepared by the method described in Example 1:

| | Parts by weight |
|---|---|
| Lacquer grade nitrocellulose (quarter-second viscosity) | 12.8 |
| 42% hydrogenated castor oil modified alkyd resin prepared above (solids) | 11.5 |
| 2-ethyl hexanediol adipate polyester plasticizer | 1.8 |
| Benzyl butyl phthalate plasticizer | 1.4 |
| Titanium dioxide pigment | 10.6 |
| Solvents and diluents | 61.9 |
| | 100.0 |

This lacquer was retained for subsequent testing. It contained 0.9 part by weight of alkyd resin and 0.25 of plasticizer mixture for each part by weight of nitrocellulose.

Prior art lacquers A, B, C, D

Four prior art lacquers were prepared to show the adverse effect on stain resistance of using the wrong kind of alkyd resin, but still the kind commonly used in automobile lacquers. The prior art lacquers were prepared as in Example 1 in accordance with the following formulas:

PRIOR ART LACQUER A

| | Parts by weight |
|---|---|
| Lacquer grade nitrocellulose (half-second viscosity) | 12.6 |
| 30% coconut oil modified alkyd resin (solids) | 8.1 |
| Benzyl butyl phthalate plasticizer | 6.5 |
| Titanium dioxide pigment | 11.3 |
| Solvents and diluents | 61.5 |
| | 100.0 |

PRIOR ART LACQUER B

Same as A above except that an equal weight of dibutyl phthalate was substituted for the benzyl butyl phthalate.

PRIOR ART LACQUER C

| | Parts by weight |
|---|---|
| Lacquer grade nitrocellulose (half-second viscosity) | 12.6 |
| 52.8% coconut oil modified alkyd resin (solids) | 8.1 |
| 2-ethyl hexane diol adipate polyester plasticizer | 6.5 |
| Titanium dioxide pigment | 11.3 |
| Solvents and diluents | 61.5 |
| | 100.0 |

PRIOR ART LACQUER D

Same as C above except that an equal weight of dibutyl phthalate was substituted for the 2-ethyl hexane diol adipate polyester.

The stain resistance of the lacquers of Examples 1 and 2, representing the products of this invention, and the prior art lacquers A–D, representing products outside the scope of this invention, was determined by thinning the lacquers to spraying viscosity, spraying coatings about 2 mils thick (when dry) on separate clean steel panels, force-drying them at 180° F. for 20 minutes, and cooling them to room temperature. Then rubbery doorgasket cement, hypoid gear oil and cup grease were applied separately to the coatings to cover areas about the size of a silver half dollar and were left in contact with the coatings for 16 hours at room temperature, about 77° F. At the end of this period the panels were wiped clean and examined in bright sunlight for discoloration from the cement, oil and grease.

Based on the scale of 10=no stain, 9=excellent, 8= acceptable for automobile lacquers, and below 8=not acceptable; the products tested had the following ratings:

| | Stain rating |
|---|---|
| Example 1 | 10 |
| Example 2 | 8 |
| Prior art lacquer: | |
| A | 7.5 |
| B | 6 |
| C | 4 |
| D | 2 |

In related experiments it was determined that other alkyd resins modified with 40%–50% of substantially completely hydrogenated castor oil and having the previously defined unreacted hydroxyl content and acid number could be substituted for the alkyd resins used in Examples 1 and 2 to produce lacquers having equivalent stain resistance.

It will be obvious to those skilled in the lacquer and alkyd resin arts that the 40%–50% hydrogenated castor oil modified alkyd resins required in this invention can be prepared by the specific method disclosed in the examples or by other well known methods, such as the method used in the examples of Robinson U.S. Patent 2,123,206, or the fusion method in the absence of reflux solvent. Furthermore, the alkyd resins can be prepared at other solids concentrations such as 40%, 50% or 70%. Although glycerine is the preferred polyhydric alcohol, others such as sorbitol, pentaerythritol, and ethylene glycol can be substituted for all or part of the glycerine. Likewise, although phthalic anhydride or orthophthalic acid is the preferred polybasic acid, other forms of phthalic acid such as isophthalic acid can be used. Other polybasic acids commonly used in alkyd resins can be employed, preferably as only a small proportion of the polybasic acid component. Alkyd resins as defined above can be substituted, within the limits specified, for all or part of the alkyd resins used in the examples.

Likewise other plasticizers or mixtures thereof can be substituted in the examples in the same or different proportions within the limits specified to produce lacquers having stain resistance equivalent to the products of the examples. Examples of other plasticizers which are suitable are propylene glycol sebacate polyester, propylene glycol adipate polyester, methyl phthalyl ethyl glycolate, ethyl phthalyl ethyl glycolate, dimethyl phthalate, butyl cyclohexyl phthalate, castor oil and blown castor oil.

It will be obvious to those skilled in the lacquer art that other grades of nitrocellulose commonly used in lacquers, such as one-eighth second, one second, and even lower or higher viscosity grades can be substituted in the same or different proportions, within the limits specified, for the half- and quarter-second grades used in the examples. The preferred grade has a viscosity in the range of one-quarter to one-half second.

For purposes of simplicity, only two sets of proportions of the three types of organic film-forming material required in this invention were used in the examples, namely nitrocellulose:alkyd resin:plasticizer is 1:1.05:0.1 in Example 1 and 1:0.9:0.25 in Example 2. A wide range of other ratios can be used in the products of this invention, such as, for each part by weight of nitrocellulose, 0.5–1.5 parts of alkyd resin, and 0.0–0.6 of plasticizer; the total alkyd resin and plasticizer being between 1.0 and 1.5 times the weight of nitrocellulose. Proportions within these ranges can be substituted for the proportions used in the examples to provide lacquers having the improved stain resistance of this invention. The preferred proportions are, for each part by weight of nitrocellulose, 0.8–1.1 of alkyd resin and 0.25–0.4 of plasticizer, with a total of alkyd resin and plasticizer between 1.1 and 1.2 times the weight of nitrocellulose.

The invention is obviously not limited to the titanium dioxide used as an illustrative pigment in the examples. Other well known pigments can be substituted for all or part of the titanium dioxide in the examples or can be used in other proportions well known in the art. Such pigments include metal oxides, hydroxides, chromates, silicates, sulfides, sulfates and carbonates, carbon blacks, organic dyestuffs and likes thereof, and metal flake pigments like aluminum. However since the primary object of this invention, i.e. stain resistance, is needed mostly in light-colored lacquers, the improvements provided by this invention are most useful in lacquers made with white pigments or blends thereof with small amounts of colored pigments to produce light tints.

Any of a wide variety of solvents and diluents commonly employed in the organic coating art can be used in the lacquers of this invention, such as aliphatic and aromatic hydrocarbons, alcohols, ketones and esters.

As indicated in the examples, metallic driers, accelerators, inhibitors, dispersing agents, surface active agents and similar commonly employed additives are not required in the lacquers of this invention. However, they can be used in small amounts where their addition contributes to a desirable property.

The products of this invention can be applied by wellknown means such as spraying, dipping and brushing. They can be air dried at normal painting temperatures or force dried at elevated temperatures, such as 100°–200° F.

The products of this invention are useful for coating a wide variety of wood, metal, or other type articles. They are particularly useful for coating suitably primed automobile bodies which are susceptible to staining from oil, grease, tar, rubbery adhesives and the like, in which case the lacquers of this invention provide a novel degree of resistance to such staining without interfering with other important requirements of automobile lacquers.

Many widely different embodiments of this invention can be made without departing from the spirit and scope thereof. Therefore, it is not intended to be limited except in accordance with the appended claims.

I claim:
1. A light-colored liquid coating composition, which produces a dry coating characterized by resistance to discoloration from contact with oil, grease, tar, rubbery adhesives and the like, comprising pigment, volatile organic solvent and organic film-forming material consisting of (a) lacquer grade nitrocellulose and, for each part by weight of nitrocellulose, (b) 0.5–1.5 parts by weight of alkyd resin containing a phthalic acid moiety, containing unesterified hydroxyl groups equivalent to 1.5%–7% by weight of glycerine, having an acid number less than 15, and being modified with 40%–50% by weight of hydrogenated castor oil, said oil having an iodine number less than 8, and (c) up to 0.6 part by weight of plasticizer; the total weight of (b) plus (c) being 1.0–1.5 times the weight of (a).

2. A product of claim 1 in which the unesterified hydroxyl groups in alkyd resin (b) are present in an amount equivalent to 4.5%–6% by weight of glycerine.

3. A priduct of claim 1 in which the acid number of alkyd resin (b) is not more than 5.

4. A product of claim 1 in which alkyd resin (b) is modified with 45%–48% by weight of hydrogenated castor oil.

5. A product of claim 1 in which the hydrogenated castor oil has an iodine number of not more than 5.

6. A product of claim 1 in which there is present, for each part by weight of (a) nitrocellulose, (b) 0.8–1.1 parts by weight of alkyd resin and (c) 0.25–0.4 part by weight of plasticizer, the total weight of (b) plus (c) being 1.1–1.2 times the weight of (a).

7. An article having a dry stain resistant coating of a product of claim 1.

8. A light-colored liquid coating composition, which produces a dry coating characterized by resistance to discoloration from contact with oil, grease, tar, rubbery adhesives and the like, comprising pigment, volatile organic solvent and organic film-forming material consisting of (a) lacquer grade nitrocellulose and, for each part by weight of nitrocellulose, (b) 0.5–1.5 parts by weight of alkyd resin containing a phthalic acid moiety, containing unesterified hydroxyl groups equivalent to 1.5%–7% by weight of glycerine, having an acid number less than 15, and being modified with 40%–50% by weight of hydrogenated castor oil, said oil having an iodine number less than 8.

References Cited in the file of this patent

UNITED STATES PATENTS

| | | |
|---|---|---|
| 1,863,264 | Bradley | June 14, 1932 |
| 2,260,889 | Donovan | Oct. 28, 1941 |
| 2,315,347 | Moffett | Mar. 30, 1943 |
| 2,491,811 | Ham | Dec. 20, 1949 |
| 2,683,668 | Godshalk | July 13, 1954 |